United States Patent Office 3,576,824
Patented Apr. 27, 1971

3,576,824
ALPHA-SUBSTITUTED BETA-PROPIOLACTONE
PURIFICATION
Arie Klootwijk, deceased, late of Purmerend, Netherlands, by Johanna Maria Klootwijk, personal representative, Purmerend, Netherlands, assignor to Shell Oil Company, New York, N.Y.
No Drawing. Continuation-in-part of abandoned application Ser. No. 541,099, Apr. 8, 1966. This application Nov. 18, 1968, Ser. No. 779,301
Claims priority, application Netherlands, Sept. 14, 1965, 6511922
Int. Cl. C07d 3/00
U.S. Cl. 260—343.9
8 Claims

ABSTRACT OF THE DISCLOSURE

Purification of α-substituted β-propiolactones contaminated with the normal impurities of α-substituted β-propiolactone production is effected by contacting the lactone with an organic isocyanate in the liquid phase at a temperature from about 100° C. to about 160° C., and recovering lactone of enhanced purity from the resulting mixture.

CROSS REFERENCE TO RELATED APPLICATIONS

This application is a continuation in-part of copending application of Arie Klootwijk, U.S. Ser. No. 541,099, filed Apr. 8, 1966 now abandoned.

BACKGROUND OF THE INVENTION

α-Substituted β-lactones are of interest as precursors of polymeric materials useful in the production of synthetic fibers. Such polymeric polyesters, when of high molecular weight, have been found to possess many interesting and desirable properties. In the presence of the impurities normally encountered during production of α-substituted β-lactones, polymerization of the lactone monomers to high molecular weight polymeric product becomes difficult. It therefore is of advantage to provide a method for purification of the lactone monomer so that high molecular weight product is more readily obtainable upon subsequent polymerization.

It is known that lactones may be purified by adding thereto an organic isocyanate and slowly distilling the lactone from the resulting mixture at a temperature below 65° C. and at a reduced pressure. See, for example, the French Pat. No. 1,341,074, issued Sept. 16, 1963, to Shell Internationale Research Maatschappij N.V. This method is not entirely satisfactory, as the relatively low temperature employed results in a low rate of reaction between the impurities present in the β-propiolactone and the added isocyanate and as a result the distillative removal of purified β-propiolactone is necessarily slow. Furthermore, to obtain α-substituted β-propiolactone of high purity, it is necessary to repeat the purification procedure. Heretofore it has been considered essential to avoid subjecting the β-propiolactone monomer to a high temperature as it is known that autopolymerization normally occurs when the lactone is maintained at an elevated temperature, particularly a temperature of 100° C. or higher. See, for example, the U.S. Pat. No. 3,117,980, issued Jan. 14, 1964, to Martin.

SUMMARY OF THE INVENTION

It has now been found that α-substituted β-propiolactone containing minor amounts of active hydrogen compound impurities normally encountered during production of α-substituted β-propiolactone by the halogenation of the corresponding α-substituted propionic acid and cyclization of the resulting α-substituted β-halopropionic acid in the presence of alkali metal hydroxide is purified by intimately contacting said relatively impure α-substituted β-propiolactone with an organic isocyanate, optionally in the additional presence of certain catalysts, at a temperature above about 100° C. and recovering from the mixture a lactone of increased purity. The process is characterized by a rapid and efficient reduction of the impurity content of the lactone without the undue polymerization normally attendant to the maintenance of polymerizable lactones at elevated temperatures.

DESCRIPTION OF PREFERRED EMBODIMENTS

The α-substituted β-propiolactone suitably purified by the process of the invention is a β-propiolactone of at least one substituent other than hydrogen on the carbon atom alpha to the carboxy moiety. One class of such lactones comprises lactones of from 4 to 10 carbon atoms represented by the formula.

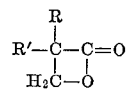

wherein R is alkyl of up to 7 carbon atoms and R' is hydrogen or R. Illustrative of such lactones are α-methyl-β-propiolactone, α-ethyl-β-propiolactone, α-butyl-β-propiolactone, α-methyl-α-ethyl-β-propiolactone, α,α-dimethyl-β-propiolactone, α-ethyl-α-tert-butyl-β-propiolactone and α-methyl-α-hexyl-β-propiolactone. In general, preferred lactones of the above formula are those wherein both R and R' are alkyl and particularly satisfactory results are obtained when the process is applied to α,α-dimethyl-β-propiolactone.

One of the more commercially feasible methods of producing α-substituted β-propiolactone comprises a two step reaction sequence starting with the halogenation of α-substituted propionic acid and resulting in the production of α-substituted β-halopropionic acid. The second step consists essentially of ring closure by the dehydrohalogenation of α-substituted β-halopropionic acid in the presence of inorganic bases which are strong enough to neutralize the α-substituted β-halopropionic acid in water. Bases which satisfy this requirement are, for example, alkali metal hydroxides, alkali metal bicarbonates, and the like, where the alkali metal is sodium or potassium. This ring closure of the alkali metal α-substituted β-halopropionate to produce α-substituted β-propiolactone is normally carried out in situ without isolation of intermediates. Hence, the active hydrogen compound impurities normally encountered in such production comprise (a) free acid starting material, e.g., α-substituted β-propionic acid, (b) halogenated acids, e.g., α-substituted β-halopropionic acid and α-substituted dihalopropionic acids, and (c) hydroxy acids arising from hydrolysis of lactone end product, e.g., α-substituted hydroxypropionic acid. By way of illustration, in the production of α,α-dimethyl-β-propiolactone (pivalolactone) by the halogenation of pivalic acid and dehydrohalogenation of the resulting monohalopivalic acid, where halo is chloro or bromo, in aqueous alkali metal hydroxide, the active hydrogen compound impurities normally appearing in the relatively impure, α,α-dimethyl-β-propiolactone are pivalic acid, monohalopivalic acid such as monochloropivalic acid or monobromopivalic acid, dihalopivalic acids such as dichloropivalic acids or dibromopivalic acids, and hydroxypivalic acid. Impurities in α,α-dimethyl-β-propiolactone as produced also include acetaldehyde and isobutyraldehyde. To the extent that these aldehydes are enolized by the acids present, they too are active hydrogen compound impurities.

Purification of the hereinabove described relatively impure α-substituted β-lactone is effected by intimately contacting the lactone with a minor proportion of an organic isocyanate. The isocyanate is an organic mono- or diisocyanate wherein the organic moiety has up to 15 carbon atoms and is aliphatic or is aromatic, but is preferably free from aliphatic unsaturation. The organic portion of the isocyanate is hydrocarbon, that is, contains only atoms of carbon and hydrogen besides the nitrogen, carbon and oxygen of the isocyanate moiety (moieties), or is substituted hydrocarbon incorporating one or more, preferably no more that 1, non-hydrocarbyl substituents free from active hydrogen atoms such as nitro, alkoxy and halo, preferably halo of atomic number from 17 to 35 inclusive, i.e., chloro or bromo. Suitable organic isocyanates employed in the process of the invention include cyclohexylisocyanate, n-amylisocyanate, butane - 1,4-diisocyanate, hexane - 1,6-diisocyanate, phenylisocyanate, tolylisocyanate, p-ethoxyphenylisocyanate, p-chlorophenylisocyanate, m-bromophenylisocyanate, p-nitrophenylisocyanate, naphthalene - 1,5 - diisocyanate, 1,1'-diphenylmethane-4,4' - diisocyanate, toluene - 2,4 - diisocyanate, toluene-2,6-diisocyanate and toluene-2,5-diisocyanate. In general, aromatic mono- to diisocyanates are preferred over analogous aliphatic isocyanates, particularly hydrocarbyl mononuclear aromatic isocyanates. An especially preferred class of isocyanates, in part because of the availability thereof comprises the toluenediisocyanates.

The organic isocyanate is employed in a minor amount relative to the β-lactone. Satisfactory results are obtained when from about 0.1% wt. to about 10% wt., based on the lactone, of organic isocyanate are employed. Amounts of organic isocyanate from about 0.5% wt. to about 4% by weight based on the lactone are employed.

To effect purification of the lactone, the α-substituted β-lactone and the organic isocyanate are intimately contacted and maintained at an elevated temperature. Although the precise temperature at which the resulting mixture is maintained is not critical, in order to obtain a satisfactory rate of purification a temperature of at least about 100° C. is desired while temperatures above about 160° C. are seldom required. The temperature range of from about 110° C. to about 140° C. is particularly preferred. The pressure at which the mixture of lactone and isocyanate is maintained is not critical provided that the pressure is sufficient to maintain the mixture substantially in the liquid phase. Pressures that are substantially atmospheric or above, e.g., from about 0.5 atmosphere to about 20 atmospheres are satisfactory, although higher or lower pressures may be employed provided the lactone mixture is maintained substantially in the liquid phase. The time required to effect purification will, of course, depend in part upon the amount of impurity present in the lactone prior to treatment. In general, maintaining the lactone-isocyanate mixture at the elevated temperature for about 0.25 hr. will produce satisfactory results and contact times greater than about 8 hrs. at the elevated temperature appear to offer no further advantage. Contact times of from about 0.5 hr. to about 3 hrs. at the elevated temperature are usually satisfactory.

It is on occasion useful, although not required, to add to the β-lactone mixture, prior to or during high-temperature treatment, a minor proportion of a polyurethane catalyst. By the term "polyurethane catalyst" is meant a material useful as a catalyst in the formation of polyurethanes by reaction of isocyanates with active hydrogen compounds. Illustrative of such catalysts are halogen-free metal salts, particularly bismuth, lead and dialkyltin salts wherein the anion is nitrate, alkanoate of up to 18 carbon atoms or alkenoate of up to 18 carbon atoms, e.g., bismuth nitrate, dibutyltin dilaurate, dibutyl tin di-2-ethylhexanoate, lead 2-ethylhexanoate, lead oleate and lead hexadecanoate. A particularly suitable polyurethane catalyst is bismuth nitrate. As previously stated, no polyurethane catalyst is required for efficient operation of the lactone purification process. When present, however, only minor quantities are utilized, e.g., up to about 0.1% wt., preferably up to about 0.01% wt., based on the β-lactone.

At the conclusion of the high-temperature contact period, the β-lactone is separated from the mixture and recovered by conventional methods, e.g., distillation, preferably at reduced pressure, selective extraction, fractional crystallization or the like.

The process of the invention is useful in preparing high purity α-substituted β-propiolactone which, because of the high purity, is polymerizable by conventional methods to high molecular weight polymer, the properties of which are more useful than those polymers of a lower molecular weight.

To further illustrate the improved process of the invention, the following examples are provided. It should be understood that the details thereof are not to be regarded as limitations, as they may be varied as will be understood by one skilled in this art.

EXAMPLE I

For use in this and the subsequent example, a quantity of α,α-dimethyl-β-propiolactone was prepared by reacting bromopivalic acid with an equivalent amount of sodium hydroxide in an aqueous medium while extracting with chloroform. The chloroform was removed by distillation and the isolated lactone was distilled at 60° C. at a pressure of 12 mm.

(A) To two liters of the α,α-dimethyl-β-propiolactone prepared in this manner was added 2% wt. of toluenediisocyanate and the resulting mixture was heated at 115° C. under atmospheric pressure for 1.5 hours. At the conclusion of this period, the reaction mixture contained less than 0.5% wt. of polymer. The purified lactone was isolated from the reaction mixture by distillation at a pressure of 12 mm. and gas-liquid chromatographic analysis of the lactone distillate indicated the presence of less than 0.0001% wt. of impurities.

(B) The purification procedure described under part A was repeated except that the heating period was increased to 6.5 hours. At the conclusion of this period the reaction mixture was found to contain about 2% wt. of polymer.

(C) For purposes of comparison, a two liter quantity of the lactone prepared above was heated at 115° C. under atmospheric pressure in the absence of the isocyanate. After heating for 0.5 hour it was found that more than 50% wt. of the lactone had polymerized. The polymer thus formed had an intrinsic viscosity, measured in trifluoracetic acid, of 0.1 dl/g.

Similar results are obtained with α,α-dimethyl-β-propiolactone prepared by reacting chloropivalic acid with an equivalent amount of sodium hydroxide in an aqueous medium while extracting with chloroform followed by removal of solvent by distillation and isolation of the resulting lactone by distillation at reduced pressure.

EXAMPLE II

To determine the relative efficiency of several purification procedures, quantities of α,α-dimethyl-β-propiolactone were purified according to the process of the invention and also according to a previously known procedure. Each lactone sample thus purified was then polymerized by known methods in the presence of tetrabutylphosphonium bromide as catalyst.

It is known that the presence of impurities in β-lactones is a significant factor in determining the obtainable molecular weight of linear polymer product upon lactone polymerization. Thus, when polymerizations are conducted under otherwise comparable conditions, the obtainable molecular weight of the polymer product is dependent upon the purity of the lactone monomer, with the higher molecular weight polymers being obtained from the most highly purified lactone samples. In this example, the efficiency of purification is compared on the basis of the molecular weight of the polymer products, measured in terms of the intrinsic viscosity of the polymer as determined in trifluoroacetic acid at 25° C.

(A) When the lactone purified according to Example I, Part A, was polymerized, the resulting polymer had a molecular weight corresponding to an intrinsic viscosity of 10.2 dl/g.

(B) The purification procedure of Example I, Part A, was followed with the additional presence in the reaction mixture of 0.01% wt. of bismuth nitrate, but under otherwise identical conditions. The purified lactone thereby obtained was polymerized and the resulting polymer was found to have an intrinsic viscosity of 10.9 dl/g.

(C) The purification procedure of Part B of this example was followed, except that the temperature employed was 125° C. and the heating time was 40 minutes. The polymer formed from the lactone purified in this manner was found to have an intrinsic viscosity of 9.5 dl/g.

(D) For purposes of comparison, the α,α-dimethyl-β-propiolactone prepared according to the procedure of Example I was purified by adding to a quantity of the lactone 2% wt. of toluenediisocyanate. The lactone was distilled from the resulting mixture at 60° C. and 12 mm. pressure at a rate of 1 liter per 8 hours. Polymerization of a sample of the lactone thereby purified yielded a polymer having an intrinsic viscosity of 3.5 dl/g.

The remaining portion of the lactone was mixed with an additional 2% wt. of toluenediisocyanate and distilled again under the same conditions. Polymerization now yielded a polymer which had an intrinsic viscosity of 6.0 dl/g.

When the distillative purification was again repeated, for a second time, the polymer produced from the purified lactone had an intrinsic viscosity of 8.1 dl/g.

After the distillative purification was repeated a third time, the purity of the lactone was sufficient to allow the formation of polymeric product having an intrinsic viscosity of 11.0 dl/g.

EXAMPLE III

When a quantity of α-methyl-α-ethyl-β-propiolactone containing 1% wt. of phenylisocyanate is heated at 115° C. for 1 hour, less polymer is formed than when an equivalent quantity of the lactone is similarly treated in the absence of the isocyanate. The purified lactone is polymerized to a polymer product of high molecular weight.

What is claimed is:

1. The process of purifying an α-substituted β-propiolactone from the active hydrogen impurities normally encountered during production of said lactone by halogenation of α-substituted propionic acid followed by dehydrohalogenation with aqueous alkali metal hydroxide of the resulting α-substituted β-halopropionic acid, where halo is chloro or bromo, by (1) intimately contacting (a) a lactone of from 4 to 10 carbon atoms of the formula

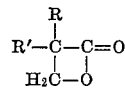

where R is alkyl and R' is hydrogen or alkyl and (b) from about 0.1% wt. to about 10% wt. based on the lactone of an organic mono- or diisocyanate of up to 15 carbons atoms free from aliphatic unsaturation and active hydrogen atoms, selected from hydrocarbon isocyanate and substituted hydrocarbon isocyanate wherein the nonhydrocarbyl substituents are nitro, alkoxy or halo of atomic number from 17 to 35 inclusive, in the liquid phase at a temperature from about 100° C. to about 160° C.; and (2) recovering from the resulting mixture lactone of enhanced purity.

2. The process of claim 1 wherein the mixture formed by intimately contacting said lactone and said isocyanate additionally contains up to about 0.1% wt., based on said lactone, of polyurethane catalyst.

3. The process of claim 1 wherein the isocyanate is a hydrocarbyl mononuclear aromatic isocyanate.

4. The process of claim 3 wherein the R' substituent of said lactone is alkyl.

5. The process of claim 4 wherein the lactone is α,α-dimethyl β-propiolactone.

6. The process of claim 4 wherein the lactone is α-methyl-α-ethyl-β-propiolactone.

7. The process of claim 3 wherein the isocyanate is toluenediisocyanate.

8. The process of claim 7 wherein the lactone is α,α-dimethyl-β-propiolactone.

References Cited

UNITED STATES PATENTS 3,117,980   1/1964   Martin _____ 260—343.9

ALEX MAZEL, Primary Examiner

B. I. DENTZ, Assistant Examiner